(12) United States Patent
Fouarge et al.

(10) Patent No.: US 9,765,165 B2
(45) Date of Patent: Sep. 19, 2017

(54) OLEFIN POLYMERIZATION PROCESS WITH CONTINUOUS DISCHARGING

(71) Applicant: TOTAL RESEARCH & TECHNOLOGY FELUY, Seneffe (BE)

(72) Inventors: Louis Fouarge, Dilbeek (BE); Annelies Horre, Temse (BE); Geert Nauwelaerts, Zoersel (BE); Rudi Tanghe, St.-Lenaarts (BE); Johan Janssens, Grobbendonk (BE); Steven Beuckelaers, Breendonk (BE); Marc Richet, Oignies en Thierache (BE); Pascal Wilderiane, Biercee (BE)

(73) Assignee: TOTAL RESEARCH & TECHNOLOGY FELUY, Seneffe (BE)

( * ) Notice: Subject to any disclaimer, the term of this patent is extended or adjusted under 35 U.S.C. 154(b) by 180 days.

(21) Appl. No.: 14/762,288

(22) PCT Filed: Jan. 21, 2014

(86) PCT No.: PCT/EP2014/051143
§ 371 (c)(1),
(2) Date: Jul. 21, 2015

(87) PCT Pub. No.: WO2014/114645
PCT Pub. Date: Jul. 31, 2014

(65) Prior Publication Data
US 2015/0361199 A1  Dec. 17, 2015

(30) Foreign Application Priority Data

Jan. 22, 2013  (EP) .................................... 13152258

(51) Int. Cl.
*C08F 210/16* (2006.01)
*C08F 2/14* (2006.01)
(Continued)

(52) U.S. Cl.
CPC ................................. *C08F 210/16* (2013.01)

(58) Field of Classification Search
CPC ............ C08F 2/01; C08F 2/14; B01J 19/1868
(Continued)

(56) References Cited

U.S. PATENT DOCUMENTS 6,864,207 B2   3/2005   Knoeppel et al.
6,930,071 B2   8/2005   Knoeppel et al.
(Continued)

FOREIGN PATENT DOCUMENTS

EA   200601476 A1   2/2007
EP   0277004 A1   8/1988
(Continued)

OTHER PUBLICATIONS

International Search Report issued in PCT/EP2014/051143, dated Apr. 1, 2014, 3 pages.
(Continued)

*Primary Examiner* — Fred M Teskin
(74) *Attorney, Agent, or Firm* — Albert Shung

(57) ABSTRACT

A process for the preparation of a polyolefin in a slurry loop reactor provided with settling legs may include introducing olefin reactants, diluents, and polymerization catalyst into the reactor while circulating. The process may include polymerizing the olefin reactants to produce a slurry, continuously withdrawing the slurry, via the settling legs, and transferring withdrawn solid olefin polymer particles to a recovery section. Each settling leg may have an inlet connected to the reactor and an outlet connected to the recovery section. At least one settling leg is continuously open, allowing continuous withdrawal of slurry. Each outlet of the settling legs may be connected to the recovery section by a (Continued)

conduit provided with a pressure control device. The pressure in the reactor may be controlled by operating the pressure control device.

18 Claims, 3 Drawing Sheets

(51) Int. Cl.
*C08F 2/01* (2006.01)
*B01J 19/18* (2006.01)

(58) Field of Classification Search
USPC .......................................... 526/64; 422/132
See application file for complete search history.

(56) References Cited

U.S. PATENT DOCUMENTS

| | | | | |
|---|---|---|---|---|
| 2002/0173598 | A1* | 11/2002 | Kendrick | B01D 3/06 526/64 |
| 2004/0122187 | A1 | 6/2004 | Verser et al. | |
| 2011/0288247 | A1* | 11/2011 | Hottovy | C08F 10/00 526/64 |

FOREIGN PATENT DOCUMENTS

| | | |
|---|---|---|
| EP | 0427696 A2 | 5/1991 |
| EP | 0891990 A2 | 1/1999 |
| RU | 2536204 C2 | 12/2014 |
| WO | 2004031245 A1 | 4/2004 |
| WO | 2005077985 A2 | 8/2005 |

OTHER PUBLICATIONS

International Preliminary Report on Patentability issued in PCT/EP2014/051143, dated Jan. 7, 2015, 4 pages.

Office Action issued in Eurasian Application No. 201591028, dated Oct. 27, 2016, 3 pages.

* cited by examiner

OLEFIN POLYMERIZATION PROCESS WITH CONTINUOUS DISCHARGING

CROSS-REFERENCE TO RELATED APPLICATIONS

This application is a National Stage Entry of PCT/EP2014/051143, filed on Jan. 21, 2014, which claims priority from EP 13152258.3, filed on Jan. 22, 2013, the entireties of which are incorporated herein by reference.

FIELD OF THE INVENTION

The present invention relates to improvements in the removal of polymer slurry from a reactor for olefin slurry polymerization.

BACKGROUND OF THE INVENTION

Olefin polymerizations such as ethylene polymerization are frequently carried out using monomer, diluent and optional catalyst and optionally co-monomers in a loop reactor. The polymerization is usually performed under slurry conditions, wherein the product consists usually of solid particles and is in suspension of a diluent. The slurry contents of the reactor are circulated continuously with a pump to maintain efficient suspension of the polymer solid particles in the liquid diluent, the product being often taken off by means of settling legs which operate usually on a batch principle to recover the product. Settling in the legs is used to increase the solids concentration of the slurry finally recovered as product slurry. The product is further either transferred to another reactor or discharged to a flash tank, through flash lines, where most of the diluent and unreacted monomers are flashed off and recycled. The polymer particles are dried, additives can be added and finally the polymer is extruded and pelletized.

In these polymerization processes, settling legs, however, do present some problems. They represent the imposition of a "batch" or "discontinuous" technique onto a basic continuous process. Each time a settling leg reaches the stage where it "discharges" or "fires" accumulated polymer slurry it causes interferences on the pressure in the loop reactor, which is thereby not kept constant. Pressure fluctuations in the loop reactor may be larger than 1 bar. At very high monomer concentration, such pressure fluctuations may generate several problems such as the creation of gas bubbles that may cause trouble in the operation of the circulation pump. They may also provoke perturbations in the control scheme of the reactor pressure.

Various alternative product removal techniques are known. EP 0891990 describes an olefin polymerization process wherein the product slurry is recovered by means of a continuous product take off, more in particular by means of an elongated hollow appendage provided on the reactor, wherein, said hollow appendage is in direct fluid communication with a heated flash line, and thus being adapted for continuous removal of product slurry.

However the above-described apparatus and processes have the disadvantage that the suspension discharged from the reactor still contains a large amount of diluent and of other reactants, such as the monomer, which it is then necessary to subsequently separate from the polymer particles and to treat for the purpose of reusing it in the reactor. Another disadvantage of the above-described apparatus and processes is their lack of flexibility during the phase or reaction start-up or in response to large disruptions in the normal behavior of the reactor, like sudden interruption of one of the feed streams. Furthermore, reliability of the discharge of the polymer slurry from the loop reactor is not high enough.

It is therefore an object of the present invention to provide a polymerization process occurring in a loop reactor wherein the polymer slurry is efficiently and continuously removed from the loop reactor. More in particular, it is an object of the invention to optimize the residence time in the settling legs. Another object of the present invention is to improve efficiency of separation of olefin polymer, reactants and diluent. It is further an object of the present invention to improve polymerization process' operability and reliability.

SUMMARY OF THE INVENTION

These present objects are achieved by the processes according to the present invention.

The present invention relates to a process for the preparation of a polyolefin in at least one slurry loop reactor provided with one or more settling legs, comprising the steps of:
  introducing into said loop reactor one or more olefin reactants, diluents, polymerization catalyst and optional ingredients and while circulating said olefin reactants, diluents and polymerization catalyst in said loop reactor;
  polymerizing said one or more olefin reactants to produce a polymer slurry comprising liquid diluent and solid olefin polyolefin particles;
  continuously withdrawing polyolefin slurry comprising polyolefin particles and diluent from said reactor, via said one or more settling legs and transferring said withdrawn solid olefin polymer particles from said loop reactor to a recovery section;
wherein
each settling leg has an inlet connected to the reactor and an outlet connected to the recovery section, and wherein at least one settling leg is continuously open allowing continuous withdrawal of said polyolefin slurry from said loop reactor, and
wherein
each outlet of said one or more settling legs is connected to the recovery section by means of at least one conduit provided with a pressure control device, and wherein the pressure in said loop reactor is controlled by operating said pressure control device.

Surprisingly, the present inventors have found that the process according to the present invention improved the operability/reliability by avoiding polymer stagnation and optimizing residence time in the settling legs. Furthermore, the process according to the present invention further improves efficiency of polymer/reactants/diluent separation by minimizing the amount of reactants/diluent transferred to recovery sections and reduces the complexity of the known processes.

The process according to the present invention does not require take-off point to be located at specific location(s) in the reactor or to have complex shape, and do not need to extend into the circulation path.

The above and other characteristics, features and advantages of the present invention will become apparent from the following detailed description and drawings, which illustrate, by way of example, the principles of the invention.

DETAILED DESCRIPTION OF THE INVENTION

Figure 1:
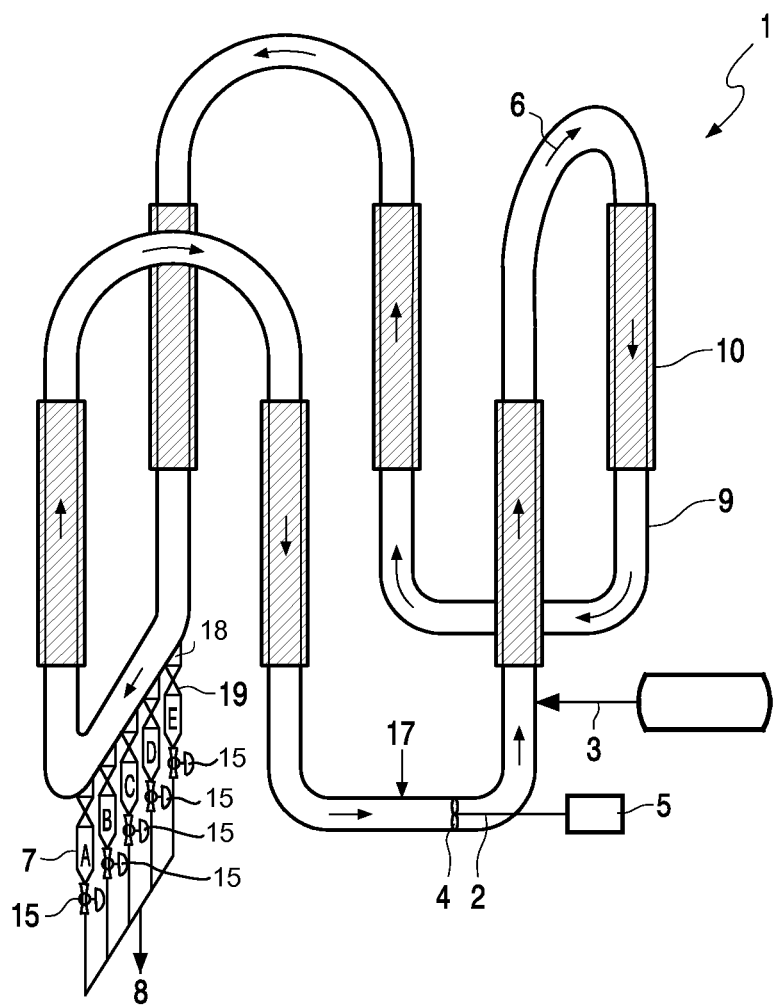
FIG. 1 represents a schematic perspective view of a single loop polymerization reactor.

It is to be understood that this invention is not limited to particular process, components, or devices described, as such methods, components, and devices may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of". The recitation of numerical ranges by endpoints includes all numbers and fractions subsumed within the respective ranges, as well as the recited endpoints.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The present invention relates to improvements in olefin polymerization process in a loop reactor utilizing a diluent, so to produce product slurry of polymer and diluent. The present invention more in particular relates to a polymerization processes for the production of polymer, wherein product slurry of polymer is continuously discharged from the loop reactor.

The present invention is applicable to any process producing effluent comprising slurry of particulate polymer solids suspended in a liquid medium comprising a diluent and unreacted monomer. Such reaction processes include those which have come to be known in the art as particle form polymerizations.

Polyolefin polymerization comprises feeding to a loop reactor the reactants including an olefin monomer, optionally one or more co-monomer(s), optionally hydrogen, a diluent, a catalyst, optionally a co-catalyst or activating agent.

As used herein, the term "loop reactor" refers to a closed circuit tubular polymerization reactor for the production of polyolefin, preferably polyethylene or polypropylene. The loop reactor comprises interconnected pipes, defining a continuous flow path for the polyolefin slurry.

Each loop reactor comprises at least two vertical pipes, at least one upper segments of reactor piping, at least one lower segments of reactor piping, joined end to end by junctions to form a complete loop, one or more feed lines, one or more outlets, one or more cooling jackets per pipe, and one pump, thus defining a continuous flow path for a polymer slurry. The vertical sections of the pipe segments are preferably provided with cooling jackets. Polymerization heat can be extracted by means of cooling water circulating in these jackets of the reactor. The reactor preferably operates in a liquid full mode.

In an embodiment, the loop reactor in said process is a single loop reactor. In another embodiment, said loop reactor is the last reactor of a loop reactor system comprising at least two loop reactors connected in series.

The present process comprises the steps of
  introducing into said loop reactor one or more olefin reactants, diluents, polymerization catalyst and optional ingredients and while circulating said olefin reactants, diluents and polymerization catalyst in said loop reactor;
  polymerizing said one or more olefin reactants to produce a polymer slurry comprising liquid diluent and solid olefin polyolefin particles;
  continuously withdrawing polyolefin slurry comprising polyolefin particles and diluent from said reactor, via said one or more settling legs and transferring said withdrawn solid olefin polymer particles from said loop reactor to a recovery section;
wherein
each settling leg has an inlet connected to the reactor and an outlet connected to the recovery section, and wherein at least one settling leg is continuously open allowing continuous withdrawal of said polyolefin slurry from said loop reactor, and wherein
each outlet of said one or more settling legs is connected to the recovery section by means of at least one conduit provided with a pressure control device, and wherein the pressure in said loop reactor is controlled by operating said pressure control device.

Preferably, the pressure in said loop reactor is controlled by operating said pressure control device and by controlling the number of continuously open settling legs.

In an embodiment, each inlet of said settling legs is connected to said reactor by means of one discharge conduit connected to said at least one loop reactor.

In an embodiment, at least one flushing system is provided in each settling leg. In an embodiment, at least one flushing system is provided in each discharge conduit. In an embodiment, at least one flushing system is provided in each settling leg and/or in each discharge conduit.

For example a flushing system, can be an isobutane flushing system, preferably to provide flushing when said settling leg is taken out of service. In another example, where the pressure control device of a continuously open settling leg is partially open, the flushing system also encompasses situations wherein the pressure control device is fully opened for a specified period of time and for a specified frequency. This is done to prevent any clogging to secure continuous discharge.

In an embodiment, two settling legs are connected to the recovery section by means of one conduit provided with a pressure control device, said conduit being connected to the outlet of both settling legs.

In an embodiment, the process comprises the steps of periodically increasing the opening of the pressure control device.

In an embodiment, the increased opening of the pressure control device is periodically performed during one to three seconds every one to five hours; preferably the periodically increased opening of the pressure control device is performed one second every two hours.

According to the invention, at least one settling leg is continuously open allowing continuous withdrawal of said slurry from said loop reactor.

In an embodiment, at least one continuously open settling leg has a variable flow rate due the pressure control device and its settings.

In an embodiment, said loop reactor is provided with two or more settling legs.

In an embodiment, at least two settling legs are continuously open allowing continuous withdrawal of said slurry from said loop reactor.

The produced polymer slurry may be continuously discharged via one or more settling legs, more specifically via at least one continuously open settling leg to the conduit provided with a pressure control device, which is connected to the recovery section.

As used herein the term "continuously open settling leg" refers to a settling leg, which while in use, is open continuously to allow continuous discharge from the loop reactor and out of the settling leg and is only closed when it is taken out of service.

In an embodiment of the present invention, the process may further comprise a step of continuously monitoring flow from said one or more settling legs, wherein said monitored flow is selected from the flow of reactants into the recovery section, flow of diluent into the recovery section, the flow of polymer solids into recovery section, the total flow transferred into recovery section, and combinations thereof.

In an embodiment, the process further comprises the step of controlling the number of continuously open settling legs, with preference the step of controlling the number of continuously open settling legs comprises monitoring one or more parameters selected from the ratio between polymer solids and reactants transferred into recovery section, the ratio between polymer solids and diluent transferred into recovery section, the residence time of polymer solids in each settling leg and combinations thereof. For example, the ratio monitored is the ratio between polymer solids and both diluents and reactants Preferably said monitoring is a continuous monitoring.

In an embodiment, the step of controlling the number of continuously open settling legs comprises one or more of:
i) raising the number of continuously open settling legs when:
the ratio between polymer solids and reactants transferred into the recovery section is lower than a first predetermined value; and/or
the ratio between polymer solids and diluent transferred into the recovery section is lower than a first predetermined value; and/or
the residence time of polymer solids in the settling legs is lower than a first predetermined value;

ii) lowering the number of continuously open settling legs when:
the ratio between polymer solids and reactants transferred into the recovery section is higher than a second predetermined value; and/or
the ratio between polymer solids and diluent transferred into the recovery section is higher than a second predetermined value; and/or
the residence time of polymer solids in the settling legs is higher than a second predetermined value.

The first and the second predetermined value can be the same or different for one or more parameters selected from ratio between polymer solids and reactants transferred into the recovery section, ratio between polymer solids and diluent transferred into the recovery section, the residence time of polymer solids in the settling legs, and combinations thereof. When the first and second predetermined value are different it is defined a working widow in which a defined number of settling legs are continuously opened. When the first predetermined value is the same that the second predetermined value, it is preferred that the modification of the number of the continuously open settling legs is performed after a predetermined time and if the monitored parameter(s) change is maintained. Or any other control scheme to ensure accurate and reliable control of the selected parameters.

In an embodiment, at least two settling legs are continuously open allowing continuous withdrawal of said slurry from said loop reactor, and the process further comprises the step of controlling flow distribution among the continuously open settling legs.

Preferably, the step of controlling flow distribution among the continuously open settling legs comprises:
i) monitoring flow from each settling leg, wherein said monitored flow is selected from flow of reactants into the recovery section, flow of diluent into the recovery section, flow of polymer solids into recovery section, the total flow transferred into recovery section from each settling legs and combination thereof, with preference the monitoring is performed continuously; and
ii) adjusting the monitored flow of at least one settling leg, the outlet of said settling leg being provided with a valve which is continuously open and in that said valve is used to adjust the flow of said settling leg.

The present process is applicable to the single loop reactors, double loop reactors as well as multiple loop reactors connected in series. The continuous discharge is done in the last loop reactor in series. In an embodiment, if the process is performed in single loop reactor, at least one continuously open settling leg is within that loop reactor. In another embodiment, the process is performed in a double loop reactor; at least one continuously open settling let is located in the second/subsequent loop reactor. In another embodiment, when the process is performed in multiple loop reactors connected in series, at least one continuously open settling let is located at the last loop reactor in the series.

By keeping at least one settling leg continuously open in combination with the settings in the pressure controlling device, ideal pressure conditions in the reactor are achieved. Therefore, fluctuations in reaction conditions caused by the pressure changes in the reactor are minimized and even may be avoided.

In an embodiment, the process according to the present invention comprises the step of maintaining a continuous discharge of polymer slurry out of said reactor by continuously discharging through at least one continuously open settling leg.

The process according to the present invention provides several advantages over the prior art including: allowing for a stable pressure profile of the loop reactor or if double or multiple loop reactors are used a stable pressure profile of the last loop reactor in series. The present invention also enables to establish non-fluctuating reaction conditions in a reactor during a polymerization process. More in particular, the processes according to the present invention allow to preserve pressure in the reactor at a certain value and to avoid pressure fluctuation in a polymerization reactor. The present invention furthermore improves operability and reliability by avoiding polymer stagnation and optimizes optimizing residence time in the settling legs. The present invention also improves efficiency on separation of polymer, reactants and diluent by minimizing the amount of reactants and diluent transferred to a recovery section, and reduces the complexity of the overall process. Moreover the present invention does not require specific take-off point at a specific location in the reactor and therefore the overall efficacy of the process is increased.

More in particular, the present invention relates to a polymerization process for the manufacture of particulate olefin polymers comprising the catalytic polymerization of olefins such as $C_2$ to $C_8$ olefins in a diluent containing the monomer to be polymerized, the polymerization slurry being circulated in a loop reactor to which the starting material is fed and from which the polymer formed is removed. Examples of suitable monomers include but are not limited to those having 2 to 8 carbon atoms per molecule, such as ethylene, propylene, butylene, pentene, butadiene, isoprene, 1-hexene and the like.

Preferably, the polyolefin compositions are processed at a temperature above the melt temperature, i.e. they are melt-processed. The polymerization reaction can be carried out at a temperature of from 50 to 120° C., preferably at temperature of from 70 to 115° C., more preferably at temperature of from 75 to 110° C., and at a pressure of from 20 to 100 bars, preferably at pressure of from 30 to 50 bars, more preferably at pressure of 37 to 45 bars.

In a preferred embodiment, present invention is particularly suitable for the polymerization of ethylene in isobutane diluent. Suitable ethylene polymerization includes but is not limited to homopolymerization of ethylene, copolymerization of ethylene and a higher 1-olefin co-monomer such as 1-butene, 1-pentene, 1-hexene, 1-octene or 1-decene. In an embodiment of the present invention, said co-monomer is 1-hexene.

The olefin such as ethylene polymerizes in a liquid diluent in the presence of a catalyst, optionally a co-catalyst, optionally co-monomer, optionally hydrogen and optionally other additives, thereby producing polymerization slurry.

As used herein, the term "polymerization slurry", "polyolefin slurry", "slurry", or "polymer slurry" means substantially a multi-phase composition including at least polymer solid particles and a liquid phase, the liquid phase being the continuous phase. The solids include catalyst and polymerized olefin, such as polyethylene. The liquids include an inert diluent, such as isobutane, with dissolved monomer such as ethylene and optionally, one or more co-monomers, molecular weight control agents, such as hydrogen, antistatic agents, antifouling agents, scavengers, and other process additives.

Suitable "olefin polymerization" includes but is not limited to homo-polymerization of an olefin or co-polymerization of an olefin monomer and at least one olefin co-monomer. The term "homo-polymer" refers to a polymer which is made by linking olefin monomers, in the absence of co-monomers. The term "co-polymer" refers to a polymer, which is made by linking two different types of monomers in the same polymer chain.

When using at least two loop reactors connected in series for the preparation of a polyolefin, a monomodal or multimodal polyolefin may be prepared.

By the term "monomodal polyolefin" or "polyolefin with a monomodal molecular weight distribution" it is meant, polyolefins having one maximum in their molecular weight distribution curve defined also as unimodal distribution curve. By the term "polyolefin with a bimodal molecular weight distribution" or "bimodal polyolefin" it is meant, polyolefins having a distribution curve being the sum of two unimodal molecular weight distribution curves. The term "multimodal" refers to the "multimodal molecular weight distribution" of a polyolefin, having two or more distinct but possibly overlapping populations of polyolefin macromolecules each having different weight average molecular weights. By the term "polyolefin with a multimodal molecular weight distribution" or "multimodal" polyolefin it is meant polyolefin with a distribution curve being the sum of at least two, preferably more than two unimodal distribution curves. By the term "monomodal polyethylene" or "polyethylene with a monomodal molecular weight distribution" it is meant, polyethylene having one maxima in their molecular weight distribution curve defined also as unimodal distribution curve. By the term "polyethylene with a multimodal molecular weight distribution" or "multimodal" polyethylene product it is meant polyethylene with a distribution curve being the sum of at least two, preferably more than two unimodal distribution curves.

Suitable diluents (as opposed to solvents or monomers) are well known in the art and include hydrocarbons which are inert or at least essentially inert and liquid under reaction conditions. Suitable hydrocarbons include isobutane, n-butane, propane, n-pentane, isopentane, neopentane, isohexane and n-hexane, with isobutane being preferred.

Suitable catalysts are well known in the art. Examples of suitable catalysts include but are not limited to chromium oxide such as those supported on silica, organometal catalysts including those known in the art as "Ziegler" or "Ziegler-Natta" catalysts, metallocene catalysts and the like. The term "co-catalyst" as used herein refers to materials that can be used in conjunction with a catalyst in order to improve the activity of the catalyst during the polymerization process. In some embodiments, the at least one polyolefin is prepared in the presence of a catalyst selected from the group comprising metallocene catalysts, chromium catalysts, and Ziegler-Natta catalysts.

The term "Ziegler-Natta catalyst" or "ZN catalyst" refers to catalysts having a general formula $M^1X_v$, wherein $M^1$ is a transition metal compound selected from group IV to VII from the periodic table of elements, wherein X is a halogen, and wherein v is the valence of the metal. Preferably, $M^1$ is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to $TiCl_3$ and $TiCl_4$. Suitable ZN catalysts for use in the invention are described in U.S. Pat. No. 6,930,071 and U.S. Pat. No. 6,864,207, which are incorporated herein by reference.

The term "metallocene catalyst" is used herein to describe any transition metal complexes consisting of metal atoms bonded to one or more ligands. The metallocene catalysts are compounds of Group 4 transition metals of the Periodic Table such as titanium, zirconium, hafnium, etc., and have a coordinated structure with a metal compound and ligands composed of one or two groups of cyclo-pentadienyl, indenyl, fluorenyl or their derivatives. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In an embodiment, the metallocene catalyst has a general formula (I) or (II):

$$(Ar)_2MQ_2 \quad (I); \text{ or}$$

$$R^1(Ar)_2MQ_2 \quad (II)$$

wherein the metallocenes according to formula (I) are non-bridged metallocenes and the metallocenes according to formula (II) are bridged metallocenes;
wherein said metallocene according to formula (I) or (II) has two Ar bound to M which can be the same or different from each other;
wherein Ar is an aromatic ring, group or moiety and wherein each Ar is independently selected from the group consisting of cyclopentadienyl, indenyl, tetrahydroindenyl or fluorenyl, wherein each of said groups may be optionally substituted with one or more substituents each independently selected from the group consisting of halogens, a hydrosilyl, a $SiR^2_3$ group wherein $R^2$ is a hydrocarbyl having 1 to 20 carbon atoms, and a hydrocarbyl having 1 to 20 carbon atoms, wherein said hydrocarbyl optionally contains one or more atoms selected from the group comprising B, Si, S, O, F, Cl and P; and
wherein M is a transition metal selected from the group consisting of titanium, zirconium, hafnium and vanadium; and preferably is zirconium;
wherein each Q is independently selected from the group consisting of halogens; a hydrocarboxy having 1 to 20 carbon atoms; and a hydrocarbyl having 1 to 20 carbon atoms, wherein said hydrocarbyl optionally contains one or more atoms selected from the group comprising B, Si, S, O, F, Cl and P; and
wherein $R^1$ is a divalent group or moiety bridging the two Ar groups and selected from the group consisting of a $C_1$-$C_{20}$ alkylene, a germanium, a silicon, a siloxane, an alkylphosphine and an amine, and wherein said $R^1$ is optionally substituted with one or more substituents each independently selected from the group consisting of halogens, a hydrosilyl, a $SiR^3_3$ group wherein $R^3$ is a hydrocarbyl having 1 to 20 carbon atoms, and a hydrocarbyl having 1 to 20 carbon atoms, wherein said hydrocarbyl optionally contains one or more atoms selected from the group comprising B, Si, S, O, F, Cl and P.

The term "hydrocarbyl having 1 to 20 carbon atoms" as used herein is intended to refer to a moiety selected from the group comprising a linear or branched $C_1$-$C_{20}$ alkyl; $C_3$-$C_{20}$ cycloalkyl; $C_6$-$C_{20}$ aryl; $C_7$-$C_{20}$ alkylaryl and $C_7$-$C_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl. Exemplary halogen atoms include chlorine, bromine, fluorine and iodine and of these halogen atoms, fluorine and chlorine are preferred.

The term "hydrocarboxy having 1 to 20 carbon atoms" refers to a radical having the formula —O—$R_a$ wherein $R_a$ is hydrocarbyl having 1 to 20 carbon atoms. Preferred hydrocarboxy groups are alkoxy groups. The term "alkoxy" or "alkyloxy" as used herein refers to a radical having the formula —O—$R_b$ wherein $R_b$ is alkyl. Non-limiting examples of suitable alkoxy groups include methoxy, ethoxy, propoxy, isopropoxy, butoxy, isobutoxy, sec-butoxy, tert-butoxy, pentyloxy, amyloxy, hexyloxy, heptyloxy and octyloxy. Preferred hydrocarboxy groups are methoxy, ethoxy, propoxy, butoxy, and amyloxy.

As used herein, the term "alkyl" by itself or as part of another substituent, refers to a straight or branched saturated hydrocarbon radical group joined by single carbon-carbon bonds having 1 or more carbon atoms, for example 1 to 20 carbon atoms, for example 1 to 12 carbon atoms, for example 1 to 6 carbon atoms, for example 1 to 4 carbon atoms, for example 2 to 3 carbon atoms. When a subscript is used herein following a carbon atom, the subscript refers to the number of carbon atoms that the named group may contain. Thus, for example, $C_{1-12}$alkyl means an alkyl of 1 to 12 carbon atoms. Examples of $C_{1-12}$alkyl groups are methyl, ethyl, propyl, isopropyl, butyl, isobutyl, sec-butyl, tert-butyl, pentyl and its chain isomers, hexyl and its chain isomers, heptyl and its chain isomers, octyl and its chain isomers, nonyl and its chain isomers, decyl and its chain isomers, undecyl and its chain isomers, dodecyl and its chain isomers.

As used herein, the term "$C_{3-20}$cycloalkyl", by itself or as part of another substituent, refers to a saturated or partially saturated cyclic alkyl radical containing from 3 to 20 carbon atoms. Examples of $C_{3-20}$cycloalkyl include cyclopropyl, cyclobutyl, cyclopentyl, cyclohexyl, cycloheptyl and cyclooctyl.

As used herein, the term "$C_{6-20}$aryl", by itself or as part of another substituent, refers to a polyunsaturated, aromatic hydrocarbyl group having a single ring (i.e. phenyl) or multiple aromatic rings fused together (e.g. naphthalene), or linked covalently, typically containing 6 to 20 carbon atoms; wherein at least one ring is aromatic. Examples of $C_{6-20}$aryl include phenyl, naphthyl, indanyl, biphenyl, or 1,2,3,4-tetrahydro-naphthyl.

The term "arylalkyl", as a group or part of a group, refers to an alkyl as defined herein, wherein one or more hydrogen atoms are replaced by an aryl as defined herein. Examples of arylalkyl radicals include benzyl, phenethyl, dibenzylmethyl, methylphenylmethyl, 3-(2-naphthyl)-butyl, and the like.

As used herein, the term "alkylaryl", by itself or as part of another substituent, refers to an aryl group as defined herein, wherein one or more hydrogen atoms are replaced by an alkyl as defined herein.

Preferably, the polymerization is carried out in the presence of a metallocene comprising a bridged bis-indenyl and/or a bridged bis-tetrahydrogenated indenyl catalyst component. The metallocene can be selected from one of the following formula (IIIa) or (IIIb):

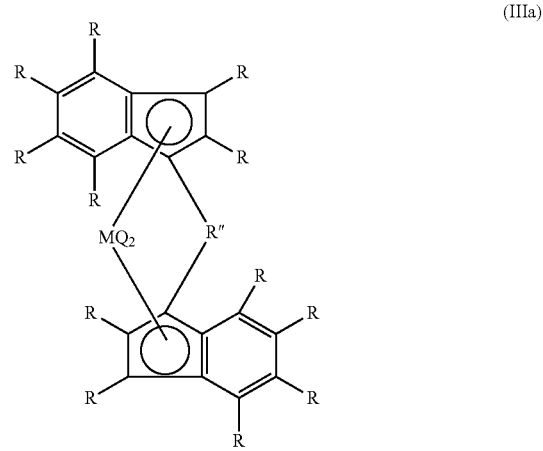

(IIIa)

-continued

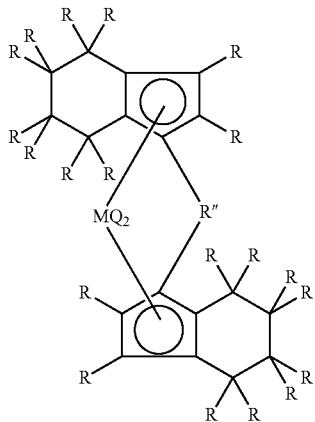

(IIIb)

wherein each R is the same or different and is selected independently from hydrogen or XR'v in which X is chosen from Group 14 of the Periodic Table (preferably carbon), oxygen or nitrogen and each R' is the same or different and is chosen from hydrogen or a hydrocarbyl of from 1 to 20 carbon atoms and v+1 is the valence of X, preferably R is a hydrogen, methyl, ethyl, n-propyl, iso-propyl, n-butyl, tert-butyl group; R" is a structural bridge between the two indenyl or tetrahydrogenated indenyls to impart stereorigidity that comprises a $C_1$-$C_4$ alkylene radical, a dialkyl germanium, silicon or siloxane, or an alkyl phosphine or amine radical; Q is a hydrocarbyl radical having from 1 to 20 carbon atoms or a halogen, preferably Q is F, Cl or Br; and M is a transition metal Group 4 of the Periodic Table or vanadium.

Each indenyl or tetrahydro indenyl component may be substituted with R in the same way or differently from one another at one or more positions of either of the fused rings. Each substituent is independently chosen.

If the cyclopentadienyl ring is substituted, its substituent groups must not be so bulky so as to affect coordination of the olefin monomer to the metal M. Any substituents XR'v on the cyclopentadienyl ring are preferably methyl. More preferably, at least one and most preferably both cyclopentadienyl rings are unsubstituted.

In a particularly preferred embodiment, the metallocene comprises a bridged unsubstituted bis-indenyl and/or bis-tetrahydrogenated indenyl i.e. all R are hydrogens. Illustrative examples of metallocene catalysts comprise but are not limited to bis(cyclopentadienyl) zirconium dichloride ($Cp_2ZrCl_2$), bis(cyclopentadienyl) titanium dichloride ($Cp_2TiCl_2$), bis(cyclopentadienyl) hafnium dichloride ($Cp_2HfCl_2$); bis(tetrahydroindenyl) zirconium dichloride, bis(indenyl) zirconium dichloride, and bis(n-butyl-cyclopentadienyl) zirconium dichloride; ethylenebis(4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, diphenylmethylene (cyclopentadienyl)(fluoren-9-yl) zirconium dichloride, and dimethylmethylene[1-(4-tert-butyl-2-methyl-cyclopentadienyl)](fluoren-9-yl) zirconium dichloride.

More preferably, the metallocene comprises a bridged unsubstituted bis-tetrahydrogenated indenyl. Most preferably the metallocene is ethylene-bis(tetrahydroindenyl)zirconium dichloride or ethylene-bis(tetrahydroindenyl) zirconium difluoride.

The metallocene catalysts can be provided on a solid support. The support can be an inert solid, organic or inorganic, which is chemically unreactive with any of the components of the conventional metallocene catalyst. Suitable support materials for the supported catalyst of the present invention include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is silica. The silica may be in granular, agglomerated, fumed or other form. The support is preferably a silica compound. In a preferred embodiment, the metallocene catalyst is provided on a solid support, preferably a silica support.

In an embodiment, the catalyst is used in the presence of a co-catalyst. The term "co-catalyst" is used interchangeably with the term "activating agent" and both terms refer to materials that can be used in conjunction with a catalyst in order to improve the activity of the catalyst during the polymerization reaction.

Suitable co-catalyst, can be compounds such as an aluminium-containing co-catalyst, a boron-containing co-catalyst, and the like.

Examples of aluminium-containing co-catalysts include, among other, dialkyl or trialkyl aluminoxane, dialkyl or trialkyl aluminoxane halide. The aluminoxane component of the aluminium-containing co-catalysts may be selected from methylaluminoxane, ethylaluminoxane, n-butylaluminoxane, and isobutylaluminoxane. Examples of boron-containing co-catalysts include, among other, trityl borate, fluorinated borane, and anilinium borate. Suitable boron-containing co-catalysts may also comprise a triphenylcarbenium boronate such as tetrakis-pentafluoro-phenyl-borato-triphenylcarbenium as described in EP 0427696, or those of the general formula [L'-H]+[B Ar1 Ar2 X3 X4]- as described in EP 0277004 (page 6, line 30 to page 7, line 7).

The alumoxanes (also referred as aluminoxanes) that may be used in the process of the present invention are well known by the person skilled in the art and preferably comprise oligomeric linear and/or cyclic alkyl alumoxanes represented by the formula:

(VI)

for oligomeric, linear alumoxanes and

(V)

for oligomeric, cyclic alumoxane,
wherein n is 1-40, preferably 10-20, m is 3-40, preferably 3-20 and $R^{10}$ is a C1-C8 alkyl group and preferably methyl.

In one embodiment, the aluminoxane is methylaluminoxane, ethylaluminoxane, n-butylaluminoxane, or isobutylaluminoxane.

In an embodiment, the catalyst used for preparing the polyolefin is a supported metallocene-alumoxane catalyst comprising a metallocene and an alumoxane which are bound on a porous silica support.

The term "chromium catalysts" refers to catalysts obtained by deposition of chromium oxide on a support, e.g. a silica or aluminum support. Illustrative examples of chromium catalysts comprise but are not limited to $CrSiO_2$ or $CrAl_2O_3$.

Optionally, other activating agent may be used in polymerization processes. The term "activating agent" refers to materials that can be used in conjunction with a catalyst in order to improve the activity of the catalyst during the polymerization reaction. A non-limiting example of an activating agent is an organo-aluminium compound, being optionally halogenated, having general formula $AlR^{11}R^{12}R^{13}$ or $AlR^{11}R^{12}Y^2$, wherein $R^{11}$, $R^{12}$, $R^{13}$ is an alkyl having from 1 to 6 carbon atoms and $R^{11}$, $R^{12}$, $R^{13}$ may be the same or different and wherein $Y^2$ is hydrogen or a halogen, as disclosed in U.S. Pat. No. 6,930,071 and U.S. Pat. No. 6,864,207, which are incorporated herein by reference. Other activating agents include Tri-Ethyl Aluminum (TEN), Tri-Iso-Butyl Aluminum (TIBAl), Tri-Methyl Aluminum (TMA), and Methyl-Methyl-Ethyl Aluminum (MMEAl).

The polymerization slurry is maintained in circulation in at least one loop reactor comprising vertical jacketed pipe sections connected through elbows. The polymerization heat can be extracted by means of cooling water circulating in the jacket of the pipes of the reactor. Said polymerization may be performed in single loop reactors, double loop reactors as well as multiple loop reactors connected in series. Double or multiple loop reactors may also be used parallel to each others. Said reactors operate in a liquid full mode. When used in series they can be connected through means such as for example through one or more settling legs of the first reactor.

The produced polymer is discharged continuously according to the process of the present invention from the loop reactor or from the last loop reactor of series along with some diluent through one or more settling legs which are continuously open and in which the solid content is increased with respect to its concentration in the body of the reactor. Typically polymer solid concentration in the loop reactor is from about 40 wt % to about 50 wt % and polymer solid concentration to the recovery section is from about 50 wt % to about 65 wt %.

According to an embodiment of the present invention, the rate of continuous discharge of the polymer slurry is such as to allow continuously and substantially uninterrupted outgoing flow from the loop reactor (from the points of discharge of the polymer slurry through at least one continuously open settling leg and also through the product recovery zone) equal to the in-going flow of feeds to the reactor.

As used herein the term "substantially uninterrupted" refers to a flow that can be interrupted no more than 5% of the time, preferably no more than 2% of the time, even more preferably no more than 0.5% of the time, and most preferably there is no interruptions.

In an embodiment, the rate of continuous discharge of the polymerization slurry out of the reactor and into a product recovery zone is such as to maintain a pressure as constant as possible in the loop reactor or in the last reactor in series if double or multiple reactors are used, and to eliminate or to minimize intermittent low-pressure pulses associated with a more important and more sudden discharge of a portion of the reactor contents that occurs with the conventional batch operating settling legs on slurry reactors.

As used herein "product recovery zone" or "recovery section" includes but is not limited to heated or not heated flash lines, flash tank, cyclones, filters, conduits and general transfer lines and the associated vapor recovery and solids recovery systems.

The discharged slurry may be depressurized and transferred through for example heated or not heated flash lines to flash tanks where the polymer and the unreacted monomer and/or co-monomer and diluent are separated. The degassing of the polymer may be further completed in a purge column.

In an embodiment of the invention, the loop reactor is provided with two or more settling leg and at least one settling leg is continuously open and at least one settling leg is operated in a discontinuous mode.

Referring now to the drawings, FIG. 1 schematically illustrates an example of a loop reactor 1 according to the invention. Said loop reactor 1 comprises a plurality of interconnected pipes 9. It will be understood that while the loop reactor 1 is illustrated with six vertical pipes, said loop reactor 1 may be equipped with less or more pipes, such as 4 or more pipes, for example between 4 and 20 vertical pipes. The vertical sections of the pipe segments 9 are preferably provided with heat jackets 10. Polymerization heat can be extracted by means of cooling water circulating in these jackets of the reactor. Reactants are introduced into the reactor 1 by line 3. Catalyst, optionally in conjunction with a co-catalyst or activation agent, is injected in the reactor 1 by means of the conduct 17. It is to be understood that FIG. 1 is a simplified illustration of a loop reactor and that said diluent, co-monomers, monomers catalysts and other additives may enter the reactor separately. In a preferred embodiment as illustrated herein, catalysts are introduced just upstream from the circulation pump 2, diluent, monomer, potential co-monomers and reaction additives just downstream of the circulation pump 2.

The polymerization slurry is directionally circulated throughout the loop reactor 1 as illustrated by the arrows 6 by one or more pumps, such as axial flow pump 2. The pump may be powered by an electric motor 5. As used herein the term "pump" includes any device from compressing driving, raising the pressure of a fluid, by means for example of a piston or set of rotating impellers 4.

The reactor 1 is further provided with one or more settling legs 7 connected to the pipes 9 of the reactor 1. Although only five settling legs 7A to 7E are illustrated in FIG. 1, the present processes encompasses loop reactor comprising one or more settling legs. In an embodiment of the present invention, said loop reactor comprise 1 to 20 settling legs, preferably 4 to 12 settling legs, more preferably 6 to 10 settling legs. In an embodiment, each settling leg is connected to the pipes of said loop reactor 1 via a discharge conduit 18.

In an embodiment, a bulk valve 19 can be provided between each discharge conduit 18 and each settling leg 7. These bulk valves 19 may be ball valves for example. These valves 19 are open under normal conditions and can be closed for example to isolate a settling leg from operation (also referred as settling leg out of service). For example, said valves can be closed when the reactor pressure falls below a chosen value.

The outlet of each settling leg is connected to a discharge conduit provided with pressure control device 15. The pressure control devices 15 may be any type of device, which can permit continuous discharge of polymer slurry, while providing pressure control.

In an embodiment not shown herein, the outlets of two settling legs are connected to a single discharge conduit provided with pressure control device 15.

Polymer slurry flowing through the continuously open settling legs 7 may be removed by means of one or more product recovery lines 8, e.g. to a product recovery zone.

Figure 2:
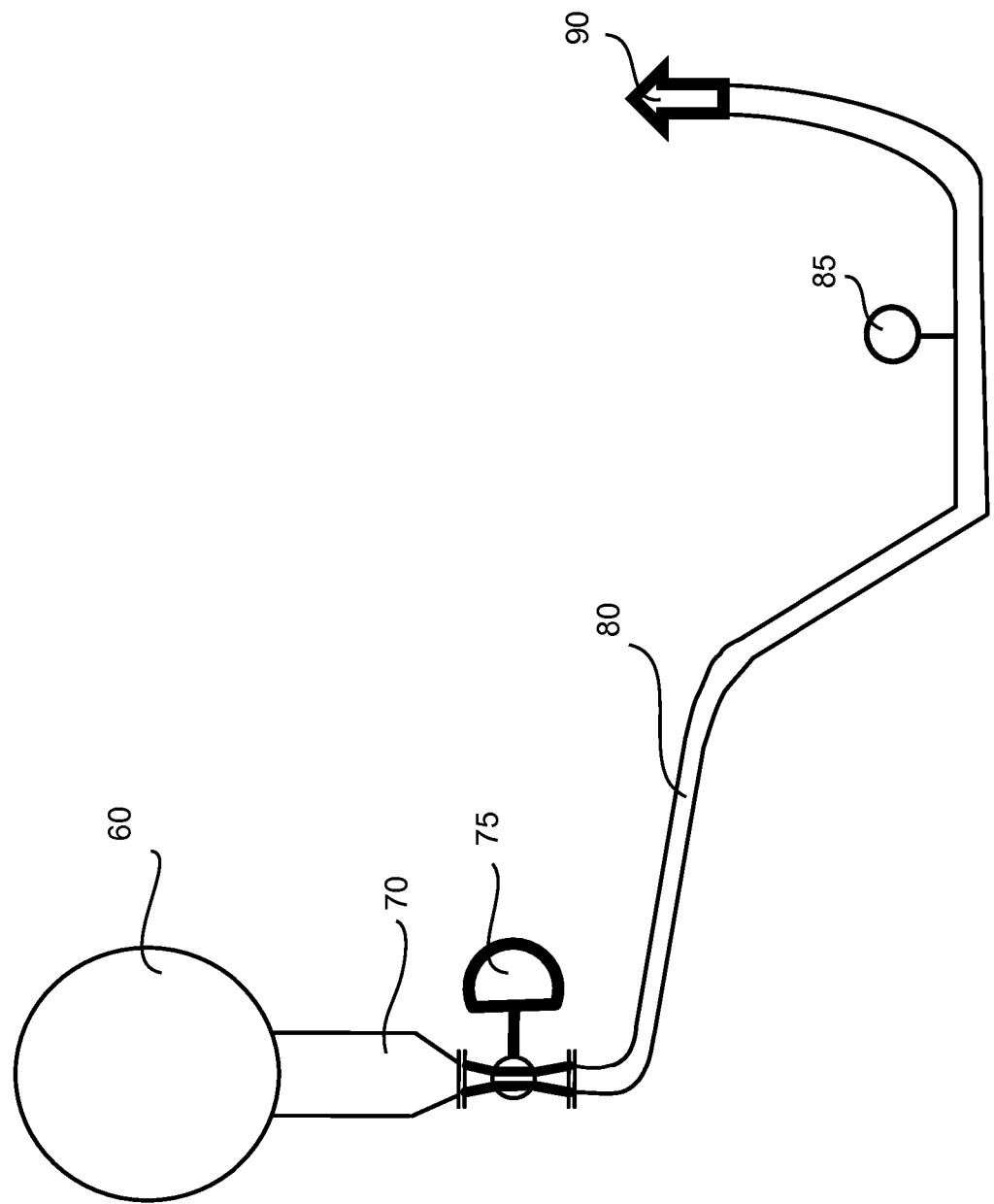
FIG. 2 represents a schematic view of a single loop polymerization reactor with an emphasized reactor pressure control valve provided on the settling leg outlet.

FIG. 2 schematically illustrates an example of a loop reactor 60 provided with one or more settling legs 70 connected to the pipes of the reactor 60. Although only one settling leg 70 is illustrated in FIG. 2, the present processes encompasses loop reactor comprising one or more settling legs.

Each settling leg is connected to a discharge conduit provided with pressure control device 75. The pressure control devices 75 may be any type of valve, which can permit continuous discharge of polymer slurry, while providing pressure control. Polymer slurry flowing through the continuously open settling legs 70 may be removed by means of one or more product recovery lines 80, e.g. to a product recovery zone 90. Sensor 85 is used to control flow distribution.

The pressure control device 15, 75 that can be used in the present invention may be any type of pressure control valve which can permit continuous discharge of polymer slurry. Non limiting examples of suitable pressure control devices to be used in the present invention are control valves such as v-ball valves as described in the US2004122187 and Eccentric plug control valves (referred as rotary globes) such as Camflex or MaxFlo valves. These valves offer conventional globe valve dynamic performance in a rotary package. These valves have advantage in their rotary and globe valve designs, and therefore, provide excellent throttling controllability in a broad range of applications, and accommodate the polymer slurry flow.

In one embodiment the pressure control device opening is increased periodically for defined period of time. This is done to prevent any clogging in the outlets to secure continuous discharge.

Settings in the pressure controlling device in combination with keeping at least one settling leg continuously open produce an ideal pressure in the loop reactor. Therefore, fluctuations in reaction conditions caused by the pressure changes in the reactor are minimized and even may be avoided.

In an embodiment of the present invention, the continuous discharging is obtained by keeping defined number of settling legs open thereby maintaining a continuous flow of discharged polymer slurry out of said reactor, while controlling the pressure using the pressure control devices provided on each outlet of each settling leg.

The number of continuously open settling legs is controlled by continuously monitoring relevant parameters for optimal operation of the settling leg. Examples of such parameters are for example ratio between polymer solids and reactants/diluent transferred into recovery section and the residence time of polymer solids in the settling legs. Low ratio between polymer solids and reactants/diluents transferred into recovery section will trigger more continuously open settling legs to be taken into the service. Whereas, long residence time of polymer solids in the settling legs will trigger a lower number of continuously open settling legs to be taken into the service.

In an embodiment a process according to present invention may further comprise step of controlling number of continuously open settling legs by continuously monitoring parameters selected from ratio between polymer solids and reactants/diluent transferred into recovery section, the residence time of polymer solids in the settling legs and mixtures thereof.

According to the present invention at least one settling leg of the loop reactor is kept continuously open. Preferably one to six settling legs are kept continuously open, for example one, two, three, four, five or six settling legs are kept continuously open, more preferably one to four settling legs are kept continuously open.

In an embodiment of the present invention, at least two settling legs are kept continuously open.

A continuously open settling leg encompasses a settling leg which has its bulk valve completely open and at the same time its pressure control device is completely or partially open.

In the process according to the present invention, the continuously open settling leg or the settling legs which are in service are open and all remaining settling legs which are out of service are closed. For example, if the reactor comprises six settling legs and that one settling leg is continuously open, then the other five legs are closed (or out of service). For example if the reactor comprises six settling legs and two legs are continuously open, then the other four legs are closed; etc.

The flow distribution among settling legs, when more than one settling leg is continuously open, can be controlled by a reactor pressure control scheme. In a general scenario, all control valves 15/75 may have the same opening, set up by said control scheme. Furthermore, opening of the control valves 15/75 can be defined independently for each settling leg by continuously monitoring flows from each settling leg. Examples for such flows are flow of reactants/diluent into the recovery section, flow of polymer solids into recovery section, the total flow transferred into recovery sections from each settling legs.

Sensors can be used to monitor the flows, wherein said sensors can be located in the settling legs or in discharge conduits or in the recovery section.

In an embodiment of the present invention, the process may further comprise the step of controlling a flow distribution among settling legs, when more than one settling leg is continuously open by monitoring flows from each settling leg wherein said monitored flows are selected from flow of reactants/diluent into the recovery section, flow of polymer solids into recovery section, the total flow transferred into recovery sections from each settling legs and mixtures thereof.

The flow distribution among continuously open settling legs can be controlled by the reactor pressure control system. In a general scenario, all control valves may have the same opening. Opening of the control valves can be also be defined independently for each settling leg by continuously monitoring flows from each settling leg. Examples for such flows are flow of reactants/diluent into the recovery section, flow of polymer solids into recovery section, the total flow transferred into recovery sections from each settling legs. Sensors can be used to monitor the flows, wherein said sensors can be located in the settling legs or in discharge conduits or in recovery sections.

In an embodiment of the present invention, the process may further comprise a step of continuously monitoring flows from said settling legs, wherein said monitored flow is selected from the flow of reactants/diluent into the recovery section, the flow of polymer solids into recovery section, the total flow transferred into recovery sections and mixtures thereof.

In a preferred embodiment, the number of continuously open settling legs as well as the corresponding number of pressure control devices are adjusted and synchronized so as to maintain a constant pressure in the reactor or alternatively maintain a constant pressure in the last reactor of the series of multiple reactor system.

According to the present invention, the number of continuously open settling legs and corresponding number of pressure control devices are adjusted and synchronized by computational means. These computational means allow the adjustment and the control of the pressure at the reactor to maintain a continuous flow of slurry out of said reactor which is now uninterrupted. Other control means such as pressure or temperature controllers and flow controllers, flow transducers and flow sensors may be used to further fine-tune the discharging process The actuation and the control of the continuous discharging through at least one continuously open settling leg can be implemented using electrical analog, digital electronic, pneumatic, hydraulic, mechanical or other similar types of equipment or combinations of one or more such equipment types. A computational means and measuring device is used in a preferred embodiment to operate and control the process parameters. Computers or other types of controlling devices can be used in the invention.

The discharge conduit and/or the settling leg can be provided with flushing system, to provide flushing when said settling leg is taken out of the service.

Figure 3:
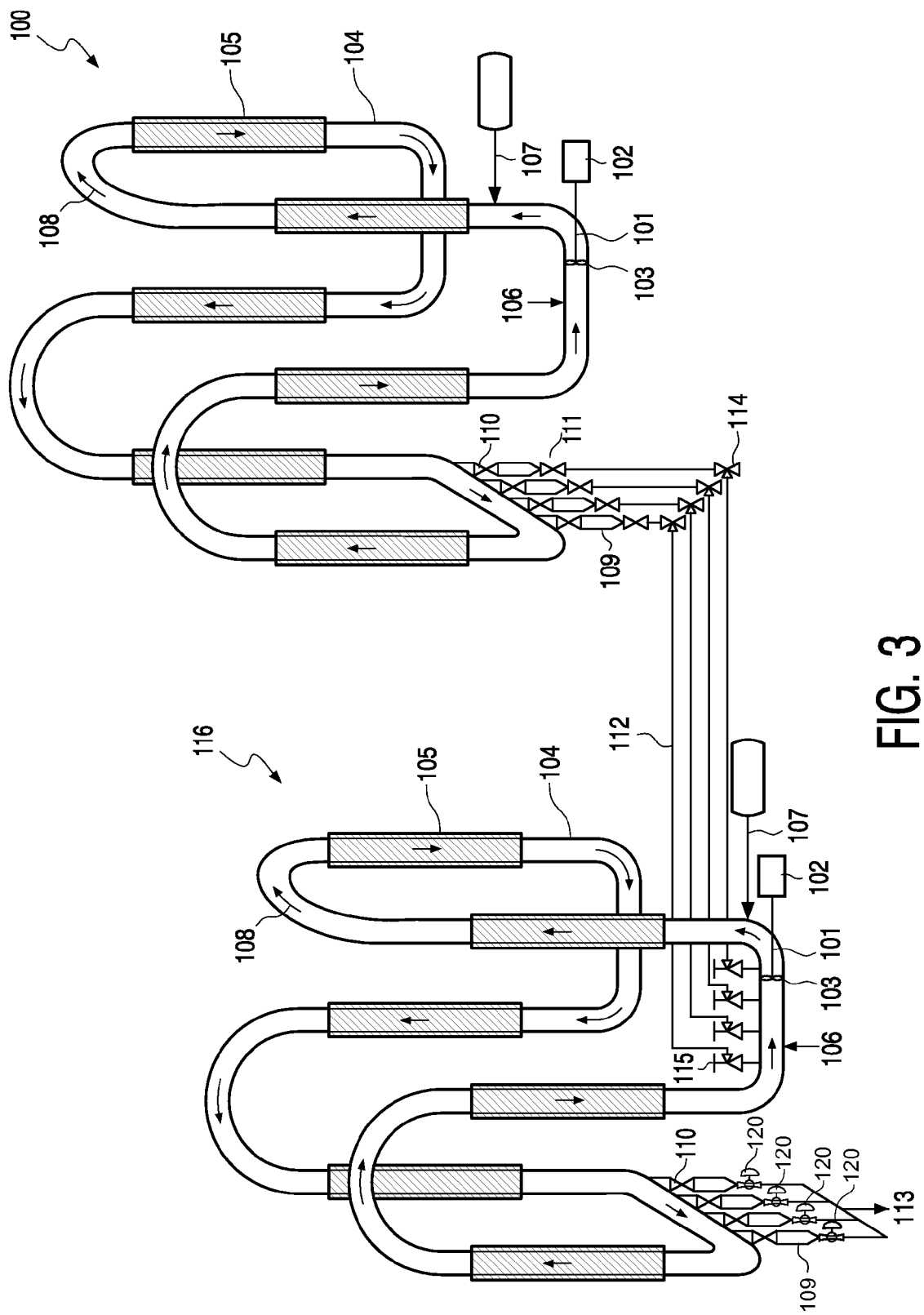
FIG. 3 represents a schematic perspective view of a double loop polymerization reactor.

The polymerization process according to the invention may further be performed in multiple loop reactors such as for example in a double loop reactor as illustrated in FIG. 3.

FIG. 3 represents two single loop reactors 100, 116, which are interconnected in series. Loop reactor 100 is first loop reactor in series and loop reactor 116 is subsequent loop reactor in series. Both reactors 100, 116 comprise a plurality of interconnected pipes 104.

The vertical sections of the pipe segments 104 are preferably provided with heat jackets 105. Reactants are introduced into the reactors 100 and 116 by line 107. Catalyst, optionally in conjunction with a co-catalyst or activation agent, may be injected in one or both of the reactors 100 and 116 by means of conduct 106. The polymerization slurry is directionally circulated throughout the loop reactors 100, 116 as illustrated by the arrows 108 by one or more pumps, such as axial flow pump 101. The pumps may be powered by an electric motor 102. The pumps may be provided with set of rotating impellers 103. The first reactor 100 is provided with one or more settling legs 109 connected to the pipes 104 of said reactor 100. The settling legs of the first reactor 100 function conventional way e.g. discharge of the polymer slurry is sequential or in batches. According to the present invention, the subsequent reactor 116 is provided with one or more settling leg 109 connected to the pipes 104 of said reactor 116 and wherein at least one settling leg of the subsequent reactor 116 is continuously open to continuously discharge polymer slurry to the recovery section. The settling legs 109 can be provided with a bulk valve 110. Further each outlet of the settling legs of the subsequent reactor 116 is provided with a pressure control device 120. Downstream exit of the settling leg 109 of the first reactor 100, is connected to a transfer line 112 which allows transfer of the polymer slurry settled in the settling legs 109 to the subsequent reactor 116, preferably through a piston valve 115. The settling legs of the first reactor 100 can be provided with optional control valves 111. The valves 111 may be any type of valves, which can permit discharge of the polymer slurry to the subsequent loop reactor, an angle valve, or ball valves may be used. For example, the valve 111 may have such a structure that solid matter is prevented from accumulating or precipitating at the main body portion of the valve. However, the type and structure of the control device can be selected by those skilled in the art as required. Along the transfer line 112, a three-way valve 114 may divert the flow to a product recovery zone if the multiple loop reactors has to be used in a parallel configuration. The polymer slurry flowing continuously through the at least one continuously open settling leg 109 of subsequent reactor 116 can be removed by means of one or more product recovery lines 113, e.g. to a product recovery zone.

It has been observed that by continuously discharging polymer slurry from a loop reactor or from the last loop reactor of series of multiple reactors according to the present invention, higher weight percent solids can be discharged from the loop reactor or from the subsequent reactor. More in particular, continuous discharge of the polymer slurry from settling legs improves the efficiency on separation of the polymer, the reactants and the diluent by minimizing amount of reactants and diluent transferred into recovery section. In addition the present invention enables to establish non-fluctuating reaction conditions in a reactor during a polymerization process. More in particular, the processes according to the present invention allow to preserve pressure in the reactor at a certain value and to avoid pressure fluctuation in a polymerization reactor. Furthermore, the process according to the present invention also improves operability and reliability of the polymerization process by avoiding polymer stagnation and optimizing residence time in the settling legs. Furthermore, the process according to the present invention also ensures proper distribution of the flows among discharge conduits.

EXAMPLES

An ethylene-hexene copolymer has been produced in presence of a Ziegler-Natta catalyst inside a double-loop reactor with various configurations of the discharge section of the second reactor. The results are summarized in the following table:

| Reactor discharge | No of settling legs | Settling legs diameter | Average polymer solids concentration in loop reactor | Average polymer solids concentration to recovery sections | Reduction of diluent/reactants flow to recovery sections (per ton of polymer produced) versus comparative example |
|---|---|---|---|---|---|
| Continuous discharge | — | — | 46 wt-% | 46 wt-% | comparative example |
| Continuous discharge | 1 (continuously open) | 10" | 46 wt-% | 53 wt-% | −24% |

-continued

| Reactor discharge | No of settling legs | Settling legs diameter | Average polymer solids concentration in loop reactor | Average polymer solids concentration to recovery sections | Reduction of diluent/reactants flow to recovery sections (per ton of polymer produced) versus comparative example |
|---|---|---|---|---|---|
| Continuous discharge | 2 (continuously open) | 10" | 46 wt-% | 56 wt-% | −33% |
| Discontinuous discharge | 6 | 10" | 46 wt-% | 57 wt-% | −36% (comparative example) |

Although the present invention has been described with considerable detail with reference to certain preferred variations thereof, other variations are possible. Therefore, the spirit and scope of the appended claims should not be limited to the preferred variations described herein.

The invention claimed is:

1. A process for the preparation of a polyolefin in at least one slurry loop reactor provided with one or more settling legs, comprising the steps of:
    introducing into said at least one slurry loop reactor one or more olefin reactants, diluents, polymerization catalyst while circulating said olefin reactants, diluents and polymerization catalyst in said slurry loop reactor;
    polymerizing said one or more olefin reactants to produce a polyolefin slurry comprising liquid diluent and solid polyolefin particles;
    continuously withdrawing polyolefin slurry comprising solid polyolefin particles and diluent from said at least one slurry loop reactor, via said one or more settling legs and transferring said withdrawn solid polyolefin particles from said at least one slurry loop reactor to a recovery section;
    wherein each settling leg has an inlet connected to the at least one slurry loop reactor and an outlet connected to the recovery section, and wherein at least one settling leg is continuously open allowing continuous withdrawal of said polyolefin slurry from said at least one slurry loop reactor, and
    wherein each outlet of said one or more settling legs is connected to the recovery section by means of at least one conduit provided with a pressure control device, and wherein the pressure in said at least one slurry loop reactor is controlled by operating said pressure control device.

2. The process according to claim 1, characterized in that each inlet of said settling legs is connected to said at least one slurry loop reactor by means of one discharge conduit connected to said at least one slurry loop reactor.

3. The process according to claim 2, wherein at least one flushing system is provided in each settling leg and/or in each discharge conduit.

4. The process according to claim 1, comprising periodically increasing an opening of the pressure control device.

5. The process according to claim 1, characterized in that each inlet of said settling legs is connected to said slurry loop reactor by means of one discharge conduit provided with a bulk valve and in that a continuously open settling leg is a settling leg having its inlet bulk valve opened.

6. The process according to claim 1, wherein said slurry loop reactor is provided with two or more settling legs.

7. The process according to claim 6, wherein at least two settling legs are continuously open allowing continuous withdrawal of said polyolefin slurry from said slurry loop reactor.

8. The process according to claim 1, wherein said process further comprises the step of continuously monitoring flow from said one or more settling legs, wherein said monitored flow is selected from the flow of reactants into the recovery section, flow of diluent into the recovery section, the flow of polymer solids into the recovery section, the total flow transferred into the recovery section, and combinations thereof.

9. The process according to claim 1, wherein said process further comprises the step of controlling the number of continuously open settling legs.

10. The process according to claim 9, wherein the step of controlling the number of continuously open settling legs comprises one or more of:
    ii) raising the number of continuously open settling legs when:
        the ratio between polymer solids and reactants transferred into the recovery section is lower than a first predetermined value; and/or
        the ratio between polymer solids and diluent transferred into the recovery section is lower than a first predetermined value; and/or
        the residence time of polymer solids in the settling legs is lower than a first predetermined value;
    iii) lowering the number of continuously open settling legs when:
        the ratio between polymer solids and reactants transferred into the recovery section is higher than a second predetermined value; and/or
        the ratio between polymer solids and diluent transferred into the recovery section is higher than a second predetermined value; and/or
        the residence time of polymer solids in the settling legs is higher than a second predetermined value.

11. The process according to claim 4, characterized in that at least two settling legs are continuously open allowing continuous withdrawal of said polyolefin slurry from said slurry loop reactor, and in that said process further comprises the step of controlling flow distribution among the continuously open settling legs.

12. The process according to claim 11, characterized in that the step of controlling flow distribution among the continuously open settling legs comprises:
    i) monitoring flow from each settling leg, wherein said monitored flow is selected from flow of reactants into the recovery section, flow of diluent into the recovery section, flow of polymer solids into the recovery section, the total flow transferred into the recovery section from each settling legs and combination thereof; and ii) adjusting the monitored flow of at least one settling leg, the outlet of said settling leg being provided with a valve which is continuously open and in that said valve is used to adjust the flow of said settling leg.

13. The process according to claim 1, wherein said slurry loop reactor is single loop reactor.

14. The process according to claim 1, wherein said slurry loop reactor is the last reactor of a loop reactor comprising at least two loop reactors connected in series.

15. The process according to claim 1, wherein said olefin is ethylene.

16. The process according to claim 9, wherein controlling the number of continuously open settling legs comprises monitoring one or more parameters selected from the ratio between polymer solids and reactants transferred into the recovery section, the ratio between polymer solids and diluent transferred into the recovery section, the residence time of polymer solids in each settling leg, and combinations thereof.

17. The process of claim 16, wherein said monitoring one or more parameters is a continuous monitoring.

18. The process according to claim 12, wherein monitoring flow from each settling leg is performed continuously.

* * * * *